(12) United States Patent
Eberlein et al.

(10) Patent No.: US 9,350,268 B2
(45) Date of Patent: May 24, 2016

(54) CONTROL DEVICE FOR SEMICONDUCTOR SWITCH ON AN INVERTER AND METHOD FOR THE ACTUATION OF AN INVERTER

(71) Applicant: Robert Bosch GmbH, Stuttgart (DE)

(72) Inventors: Edwin Eberlein, Stuttgart (DE); Andreas Schoenknecht, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 9 days.

(21) Appl. No.: 14/365,153

(22) PCT Filed: Oct. 24, 2012

(86) PCT No.: PCT/EP2012/071034
§ 371 (c)(1),
(2) Date: Jun. 13, 2014

(87) PCT Pub. No.: WO2013/091949
PCT Pub. Date: Jun. 27, 2013

(65) Prior Publication Data
US 2014/0333246 A1 Nov. 13, 2014

(30) Foreign Application Priority Data

Dec. 20, 2011 (DE) .......................... 10 2011 089 316

(51) Int. Cl.
H02P 27/04 (2006.01)
H02M 7/5387 (2007.01)
(Continued)

(52) U.S. Cl.
CPC .............. *H02M 7/5387* (2013.01); *B60L 3/04* (2013.01); *H02M 1/36* (2013.01); *H02P 27/06* (2013.01);
(Continued)

(58) Field of Classification Search
CPC .......... H02P 9/04; H02P 25/028; G02B 7/102
See application file for complete search history.

(56) References Cited

U.S. PATENT DOCUMENTS

2005/0146295 A1 7/2005 Miyamoto et al.
2005/0231171 A1 10/2005 Kato et al.
(Continued)

FOREIGN PATENT DOCUMENTS

CN 1065359 A 10/1992
CN 1102919 A 5/1995
(Continued)

OTHER PUBLICATIONS

International Search Report for Application No. PCT/EP2012/071034 dated Jan. 28, 2013 (English Translation, 3 pages).

*Primary Examiner* — Karen Masih
(74) *Attorney, Agent, or Firm* — Michael Best & Friedrich LLP (57) ABSTRACT

The invention relates to a control device (4) for the actuation of a semiconductor switch (1) on an inverter having an actuation switch (16) that is designed to generate a driver signal (18) depending on a switch signal (5) generated by a control regulation of the inverter, and a driver circuit (15) that is connected between the actuation circuit (16) and a control input (13) of the semiconductor switch (1), and which is designed to receive the driver signal (18) and a control signal (7) depending on the driver signal (18), said control signal actuating a semiconductor switch (1) for the generation and infeed into the control input (13) of the semiconductor switch (1), wherein the actuation circuit (16) is designed to generate the driver signal (18) as a consequence of driver signal pulses with a predetermined and adjustable pulse length such that the semiconductor switch (1) is not fully conductive in the event of an actuation with the control signal (7) during the pulse length.

13 Claims, 8 Drawing Sheets

(51) Int. Cl.
  *B60L 3/04*     (2006.01)
  *H02M 1/36*    (2007.01)
  *H02P 27/06*   (2006.01)
  *H02M 1/32*    (2007.01)
(52) U.S. Cl.
  CPC .......... *B60L 2210/00* (2013.01); *B60L 2210/42* (2013.01); *H02M 2001/322* (2013.01); *Y02T 10/7241* (2013.01)

(56) References Cited

U.S. PATENT DOCUMENTS

2010/0019508 A1* 1/2010 Hashimoto ............... H02P 9/04
                                                                290/40 B
2011/0080149 A1  4/2011  Fukuta et al.
2011/0221374 A1  9/2011  Maebara et al.
2011/0234176 A1  9/2011  Nakamura et al.

FOREIGN PATENT DOCUMENTS

| | | |
|---|---|---|
| EP | 2228893 A2 | 9/2010 |
| JP | S5635605 A | 4/1981 |
| JP | 2003348856 | 12/2003 |
| JP | 2005198406 | 7/2005 |
| JP | 2011083123 | 4/2011 |
| JP | 2011244522 | 12/2011 |
| WO | 2011142373 | 11/2011 |

* cited by examiner

CONTROL DEVICE FOR SEMICONDUCTOR SWITCH ON AN INVERTER AND METHOD FOR THE ACTUATION OF AN INVERTER

BACKGROUND OF THE INVENTION

The invention relates to a control device for semiconductor switches of an inverter and to a method for actuating an inverter, in particular for operating an inverter in a rapid discharge mode.

Electric and hybrid vehicles often have power electronic circuit components in the drive system between the fraction battery and the electrical machine, which components are usually constructed as voltage intermediate circuit converters. In this case, a DC voltage intermediate circuit is used as the coupling element between the traction battery and an inverter which can be actuated in order to transmit electrical power from the DC voltage intermediate circuit to the electrical machine.

Inverters may be, for example, in the form of a full-bridge circuit with a number of bridge arms with two semiconductor switches each. In this case, those semiconductor switches of the bridge arms which are connected to a first output connection of the DC voltage intermediate circuit may each be referred to as high-side switches and those semiconductor switches of the bridge arms which are connected to the second output connection of the DC voltage intermediate circuit may each be referred to as low-side switches. In this case, IGBT modules (bipolar transistors with an insulated gate electrode) with a diode reverse-connected in parallel or MOSFETs (metal oxide field effect transistors) can be used as semiconductor switches, for example.

Control systems which generate switching signals for the semiconductor switches are used to actuate the inverter. In the event of a fault, different demands are imposed on the control systems for reasons of safety. For example, it may be necessary to safely short-circuit the motor windings of the electrical machine in the event of a fault. This may be effected by closing all high-side switches and opening all low-side switches (or vice versa), which is also referred to as an "active short circuit".

In addition, it is necessary, in the event of a fault, to rapidly and reliably discharge the DC voltage intermediate circuit, in particular also if supply voltages in the control system fail. This may be effected by means of a rapid discharge. Such a rapid discharge is normatively required within a maximum rapid discharge time of five seconds in order to be able to ensure the electrical operational reliability of the vehicle.

The document US 2005/0231171 A1 discloses an electrical drive system having an electric motor, a pulse-controlled inverter and an intermediate circuit capacitor. The intermediate circuit capacitor can be discharged in a controlled manner via a corresponding switch mode of the pulse-controlled inverter.

SUMMARY OF THE INVENTION

According to one aspect, the present invention provides a control device for actuating a semiconductor switch of an inverter, having an actuation circuit which is designed to generate a driver signal on the basis of a switching signal generated by a control system of the inverter, and a driver circuit which is coupled between the actuation circuit and a control input of the semiconductor switch and is designed to receive the driver signal and to generate a control signal, which actuates the semiconductor switch, on the basis of the driver signal and to feed said control signal into the control input of the semiconductor switch, the actuation circuit being designed to generate the driver signal as a sequence of driver signal pulses with a predetermined and adjustable pulse length, with the result that the semiconductor switch is not completely conductive during the pulse length when being actuated with the control signal.

According to another aspect, the present invention provides a drive system for an n-phase electrical machine, where n≥1, having an intermediate circuit capacitor which is connected to two input voltage connections, an inverter having a multiplicity of semiconductor switches, which inverter is coupled to the intermediate circuit capacitor, is fed with electrical energy from the intermediate circuit capacitor and is designed to generate an n-phase supply voltage for the electrical machine, a multiplicity of control devices according to the invention which are each designed to generate a switching control signal for one of the semiconductor switches of the inverter, and a control system which is coupled to the multiplicity of control devices and is designed to generate switching signals for the semiconductor switches of the inverter.

According to another aspect, the present invention provides a method for actuating an inverter, having the steps of generating a driver signal for at least one of the semiconductor switches of the inverter, the driver signal having a sequence of driver signal pulses, and amplifying the driver signal in order to generate a control signal which actuates the at least one semiconductor switch, the driver signal pulses each having a predetermined and adjustable pulse length, with the result that the semiconductor switch is not completely conductive during the pulse length when being actuated with the control signal.

One concept of the present invention is to design a control device for semiconductor switches of an inverter in an electrically operated vehicle, which control device can implement a rapid or emergency discharge without being dependent on additional components to be cooled or without requiring increased circuit complexity. In this case, the rapid or emergency discharge is carried out using semiconductor switches which are present in the inverter anyway. This dispenses with the need to provide dedicated emergency discharge circuits, which can entail a considerable saving in terms of costs and installation space.

One advantage of the invention is that an inverter which is designed with a control device according to the invention and comprises a multiplicity of branch arms each with two semiconductor switches can be actuated in such a manner that one of the semiconductor switches in a particular number of bridge arms is respectively "clocked", that is to say the actuation signal consists of short actuation pulses, the pulse length of which is selected to be precisely so short that the semiconductor switch is not yet switched to be completely conductive but rather is briefly in a transition state between the blocking state and the conduction state. Not completely conductive therefore means that the conductivity has a value which is between the value of the conductivity when the switch is open and the value of the conductivity when the switch is closed, in particular that the conductivity is between 20% and 80% of the conductivity of the switch in the closed state. During this time, energy from the intermediate circuit capacitor can be converted into heat while a current flows through the respective semiconductor switches and the voltage in the intermediate circuit can therefore be quickly and effectively reduced. This affords the advantage that an intermediate circuit capacitor connected to the input connections of the inverter can be rapidly and reliably discharged via the semiconductor switches without currents flowing through a connected electrical machine as a result of the discharge.

In this case, it is particularly advantageous, on the one hand, that there is no need to install any further circuit components for discharging the intermediate circuit capacitor, which saves space and production costs. On the other hand, the semiconductor switches are thermally connected to the environment very well anyway, with the result that discharging of the intermediate circuit capacitor via the inverter does not cause any overheating of the drive system.

According to one embodiment of the control device according to the invention, the pulse length is able to be adjusted in such a manner that the semiconductor switch has a predetermined current value when being actuated with the control signal.

According to another embodiment, the control device may also have a regulation circuit which is coupled to the actuation circuit and is designed to generate a regulation signal for regulating the driver signal and to feed said regulation signal into the actuation circuit. As a result, the desired current value can be deliberately set by means of the semiconductor switch by influencing the pulse length of the driver signal pulses or the amplitude of the driver signal pulses, for example.

According to another embodiment of the control device according to the invention, the regulation circuit may be designed to record a first measurement signal representing the intermediate circuit voltage and to generate the regulation signal on the basis of the first measurement signal. A suitable discharge mode can therefore be set using one or more of the semiconductor switches, depending on the state of charge of the intermediate circuit capacitor.

According to another embodiment of the control device according to the invention, the regulation circuit may be coupled to a current sensor output of the semiconductor switch and may be designed to record a second measurement signal representing a current through the semiconductor switch and to generate the regulation signal on the basis of the second measurement signal.

According to another embodiment of the control device according to the invention, the driver circuit may have an adjustable control resistance for generating the control signal, and the actuation circuit may be designed to generate an actuating signal for adjusting the adjustable control resistance on the basis of the regulation signal and to feed said actuating signal into the driver circuit.

According to another embodiment, the control device may be designed to actuate an IGBT switch.

According to another embodiment, the inverter may have a half-bridge circuit. In this case, the actuation circuit may be designed to respectively actuate one of the semiconductor switches in a half-bridge with the driver signal and to permanently close the other of the semiconductor switches in the half-bridge. This is particularly advantageous for the implementation of an active short circuit of the inverter, in which energy from the intermediate circuit capacitor can be converted into heat while a current flows through one of the respective semiconductor switches in a half-bridge and the voltage in the intermediate circuit can therefore be quickly and effectively reduced.

According to one embodiment, the method according to the invention may also have the steps of recording a first measurement signal representing the intermediate circuit voltage, and generating a regulation signal for regulating the pulse length of the driver signal pulses on the basis of the first measurement signal.

According to another embodiment, the method according to the invention may also have the steps of recording a second measurement signal representing a current through the at least one semiconductor switch, and generating a regulation signal for regulating the pulse length of the driver signal pulses on the basis of the second measurement signal.

BRIEF DESCRIPTION OF THE DRAWINGS

Further features and advantages of embodiments of the invention emerge from the following description with reference to the accompanying drawings.

In the drawings.

DETAILED DESCRIPTION

Figure 1:
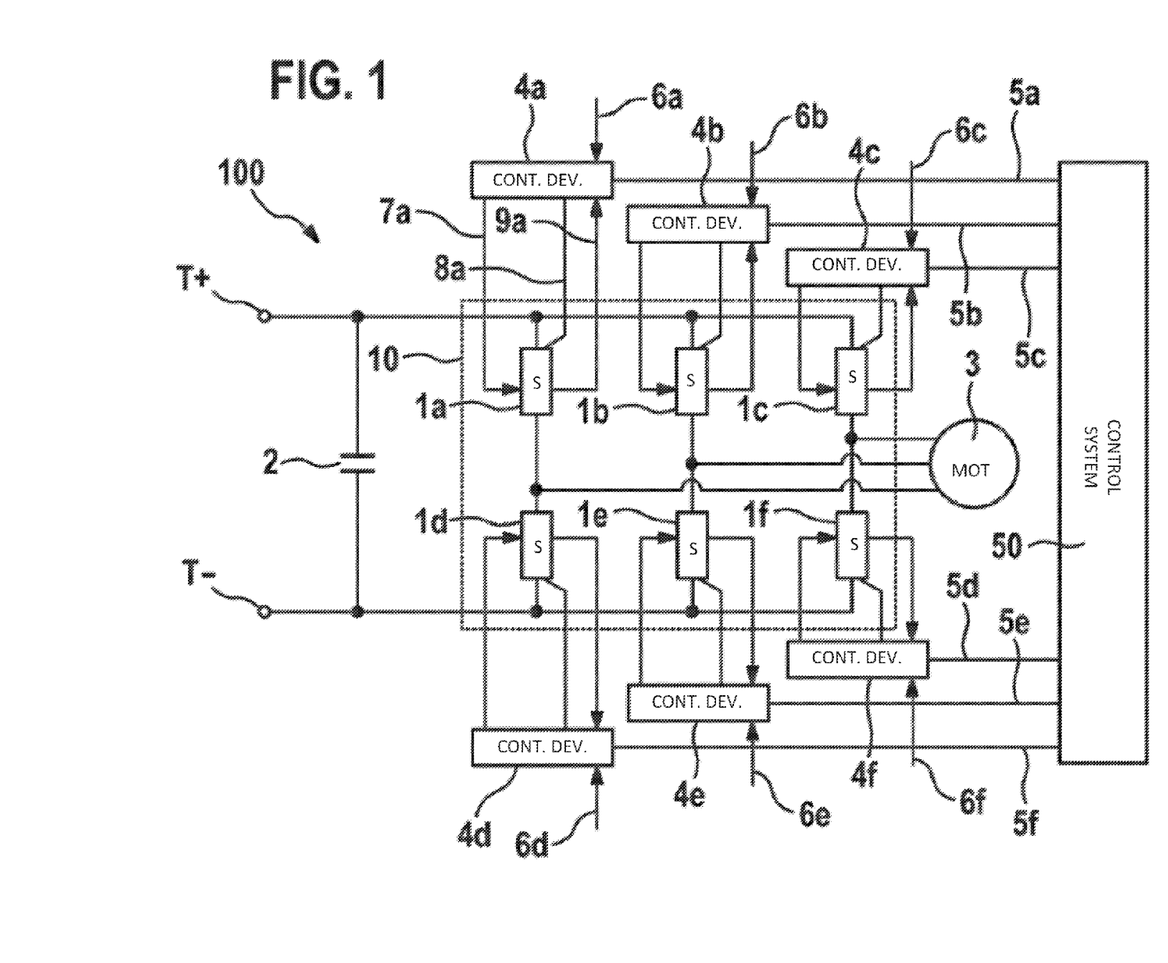
FIG. 1 shows a schematic illustration of an electrical drive system of a vehicle according to one embodiment of the invention.

FIG. 1 shows a schematic illustration of an electrical drive system 100 of a vehicle. The electrical drive system 100 comprises two input connections T+ and T− which can be supplied with high voltage by an energy storage device such as a high-voltage battery or a fraction battery of the vehicle, for example. The input connections T+ and T− are connected to a DC voltage intermediate circuit having an intermediate circuit capacitor 2. The intermediate circuit capacitor 2 is connected, via output connections, to input connections of an inverter 10, for example a pulse-controlled inverter 10. The voltage intermediate circuit converter which is illustrated in FIG. 1 and has the intermediate circuit capacitor 2 and the inverter 10 is illustrated in the form of a three-phase converter, for example, that is to say the inverter 10 comprises three bridge arms each with two semiconductor switches. The first bridge arm comprises, for example, the semiconductor switches 1a and 1d, the second bridge arm comprises, for example, the semiconductor switches 1b and 1e and the third bridge arm comprises, for example, the semiconductor switches 1c and 1f. In this case, the semiconductor switches 1a, 1b, 1c of one bridge side are referred to as high-side switches and the semiconductor switches 1d, 1e, 1f of the other bridge side are referred to as low-side switches. In this case, it should be clear that any other number of bridge arms or phases of the voltage intermediate circuit converter is likewise possible and that the designation of the semiconductor switches 1a to 1f as high-side switches and low-side switches is selected only by way of example.

In this case, the semiconductor switches 1a to 1f illustrated in FIG. 1 may have field effect transistors (FETs), for example. In one possible embodiment, the semiconductor switches are each IGBTs (Insulated Gate Bipolar Transistors), but it is likewise possible to provide other semiconductor switches in a corresponding form, for example in the form of JFETs (Junction Field-Effect Transistors) or MOSFETs (Metal Oxide Semiconductor Field-Effect Transistors). If the semiconductor switches 1a to 1f have IGBT switches, provision may be made for a diode (not illustrated in FIG. 1 for reasons of clarity) to be reverse-connected in parallel with each of the IGBT switches.

The electrical drive system 100 also has a control system 50 which is designed to generate switching signals 5a to 5f which code switching actuation of the semiconductor switches 1a to 1f. In this case, the switching signals 5a to 5f may have, for example, a logic low level when the semiconductor switches 1a to 1f are intended to be open and may have a logic high level when the semiconductor switches 1a to if are intended to be closed. The control system 50 feeds the switching signals 5a to 5f into corresponding control devices 4a to 4f which are each responsible for actuating one of the semiconductor switches 1a to 1f. The coupling of the control device 4a to the associated semiconductor switch 1a is explained below, with each of the remaining control devices 4b to 4f being able to be coupled accordingly.

The control device 4a has a control output which can be used to emit a control signal 7a to a control input of the semiconductor switch 1a in order to control the operation of the semiconductor switch 1a. The control device 4a can record measurement signals 8a and/or 9a via measuring lines. The measurement signal 8a may indicate, for example, an instantaneous current intensity through the semiconductor switch 1a. For this purpose, the measuring line which is used to record the measurement signal 8a may be coupled, for example, to a current measuring output of the semiconductor switch 1a. The measurement signal 9a may indicate, for example, an instantaneous voltage at a connection of the semiconductor switch 1a. For this purpose, the measuring line which is used to record the measurement signal 9a may be coupled, for example, to a collector connection of the semiconductor switch 1a, in particular if the semiconductor switch 1a is an IGBT switch. In this case, the measurement signal 9a may be representative of the voltage across the intermediate circuit capacitor 2.

FIGS. 2 to 6 show schematic illustrations of control devices 4 for a semiconductor switch 1. In particular, FIGS. 2 to 6 show exemplary embodiments of the control devices 4a to 4f and the associated semiconductor switches 1a to 1f in greater detail. In this case, the reference symbols used in FIGS. 2 to 6 may each be provided with letters from a to f in order to denote the respective components of the electrical drive system 100 shown in FIG. 1.

The control devices 4 shown in FIGS. 2 to 6 are generally used to actuate a semiconductor switch 1, in particular a semiconductor switch 1 of an inverter, for example of the inverter 10 in FIG. 1. The semiconductor switch 1 is shown, by way of example, in FIGS. 2 to 6 as an IGBT switch which has a collector connection 11, an emitter connection 12, a gate or control input 13 and a current sensor output 14. The current sensor output 14 can be used to discharge a current measurement signal 9 which indicates the current intensity of a current instantaneously flowing through the IGBT switch 1. The IGBT switch 1 can be actuated in different operating modes via the control input 13 by applying a corresponding control signal 7 with a particular voltage level. In a switching mode, the IGBT switch 1 can be operated only in a blocking range or saturation range, that is to say the IGBT switch 1 is either completely blocking or completely conducting. In contrast, in a linear or active mode, the IGBT switch 1 can be operated in a gain range, that is to say the current intensity of a current through the IGBT switch 1 scales in proportion or substantially in proportion to the voltage applied to the control connection.

Figure 2:
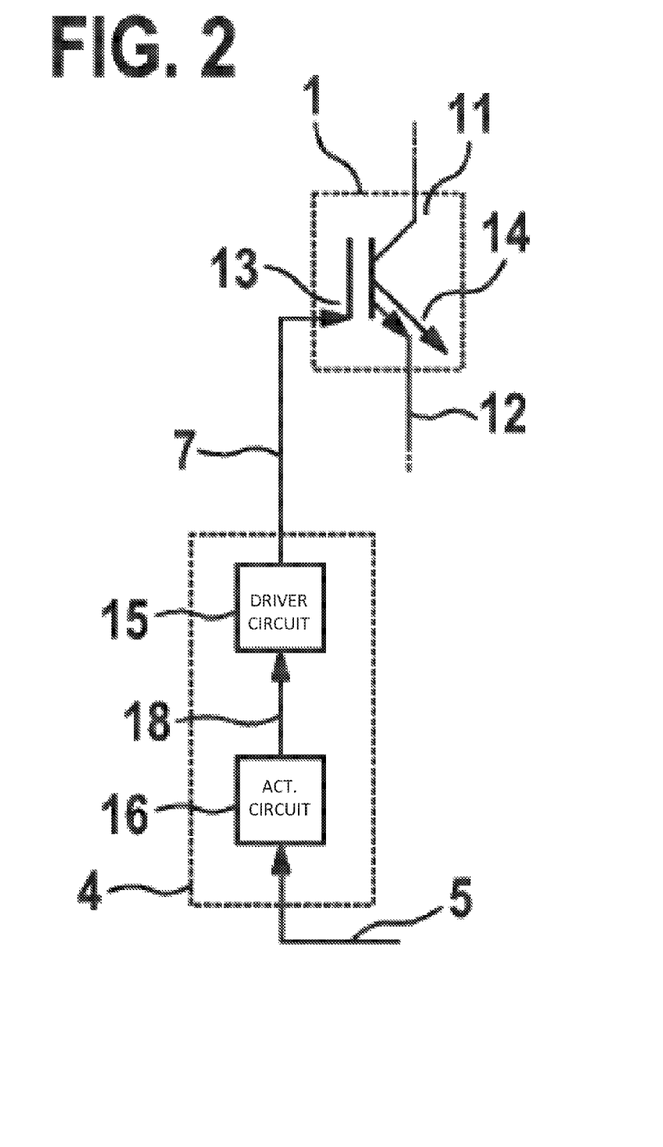
FIG. 2 shows a schematic illustration of a control device for a semiconductor switch according to another embodiment of the invention.
Figure 3:
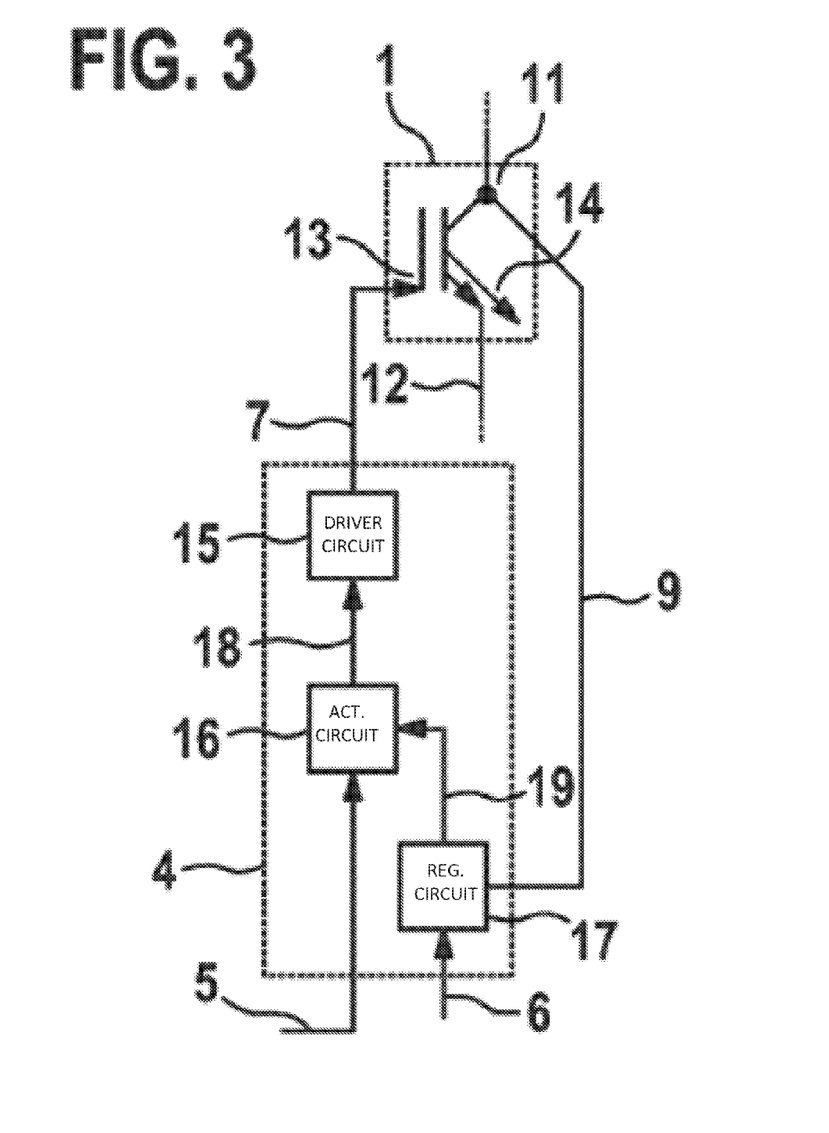
FIG. 3 shows a schematic illustration of a control device for a semiconductor switch according to another embodiment of the invention.

In the exemplary embodiment shown in FIG. 2, the control device 4 has an actuation circuit 16 which is designed to generate a driver signal 18 on the basis of a switching signal 5 generated by a control system of an inverter. In this case, the driver signal 18 may correspond substantially to the switching signal 5 in a conventional switching mode of the inverter. The switching signal 5 may have, for example, a logic high level when the IGBT switch 1 is intended to be closed and may have a logic low level when the IGBT switch 1 is intended to be opened. It goes without saying that any other actuation logic is likewise possible in this case. In the conventional switching mode, provision is made for the IGBT switch 1 to be either completely blocking or completely conducting, with the result that the switching signal 5 retains the respective logic level for a predefined period of time.

The control device 4 also comprises a driver circuit 15 which is coupled between the actuation circuit 16 and a control input 13 of the IGBT switch 1 and is designed to receive the driver signal 18 and to generate a control signal 7, which actuates the IGBT switch 1, on the basis of the driver signal 18. The control signal 7 is then fed into the control input 13 of the IGBT switch 1 by the driver circuit 15. For this purpose, the driver circuit 15 may have, for example, an internal control or gate resistance which can be used to adjust the gain of the driver signal 18 in order to generate the control signal 7.

In particular operating modes of the inverter, it may now be necessary to rapidly discharge the intermediate circuit. The control device 4 can be used to selectively "clock" an IGBT switch 1, that is to say to actuate said switch in a pulsed mode in which actuation pulses are fed into the control input 13 of the IGBT switch 1, the duration of which pulses is so short that the IGBT switch 1 is not yet switched to be completely conductive but rather is briefly in a transition state between the blocking state and the conduction state. During this time, energy from the intermediate circuit capacitor may be converted into heat while a current flows through the IGBT switch 1 and the voltage in the intermediate circuit can thus be rapidly and effectively reduced. This makes it possible, in particular, to set a rapid discharge mode in an inverter actuated in this manner, as a result of which an intermediate circuit capacitor feeding the inverter, for example the intermediate circuit capacitor 2, can be advantageously rapidly discharged. In this case, it is particularly advantageous that the components of the inverter which are already present can be used for the discharge without having to install any additional circuits or discharging elements such as switchable resistors or the like.

Figure 7:
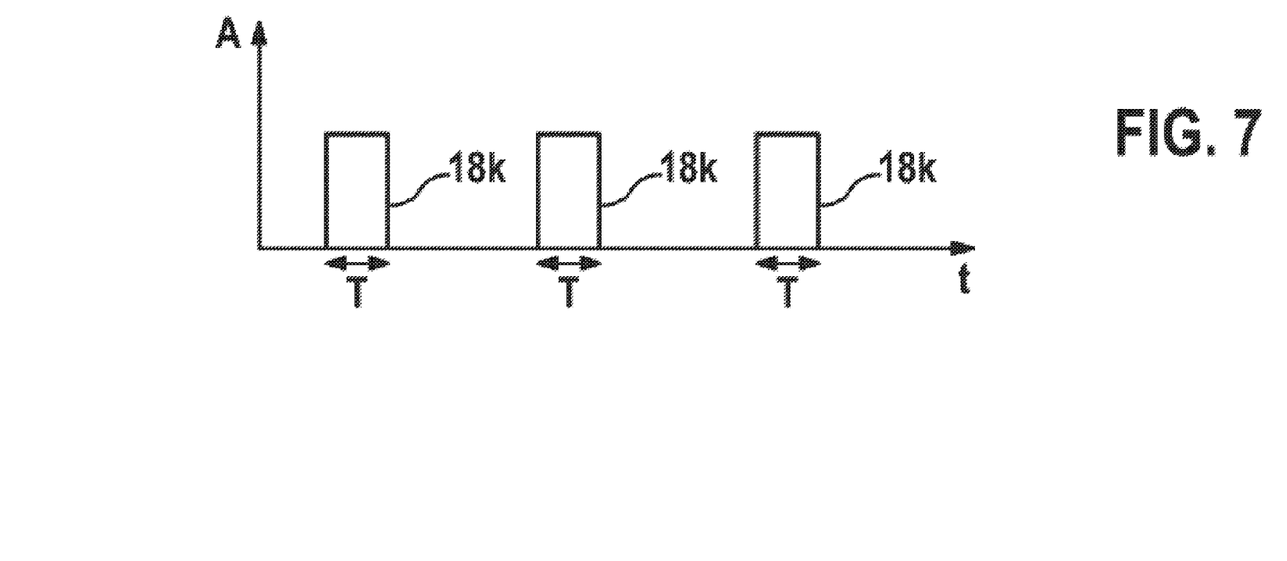
FIG. 7 shows a schematic illustration of a signal diagram of a control signal for a semiconductor switch according to another embodiment of the invention.

In order to implement this operating mode, the actuation circuit 16 may be designed to generate the driver signal 18 as a sequence of driver signal pulses with a predetermined and adjustable pulse length, with the result that the IGBT switch 1 is not completely conductive during the pulse length when being actuated with the control signal 7. One exemplary possibility for such a sequence of driver signal pulses 18k is schematically illustrated in FIG. 7. In this case, the driver signal pulses 18k each have a pulse length T. This pulse length T may be short with respect to the actuation duration in a conventional control mode of the IGBT switches 1. For example, the switching duration of an IGBT switch 1, during which the IGBT switch 1 is kept closed or open in a normal mode, may be approximately 100 µs. In this case, the pulse length T may be a few µs, for example between 0.2 µs and 5

μs. In this case, the pulse length T may be dependent on the physical parameters of the IGBT switch 1 and of the driver circuit 15.

Figure 4:
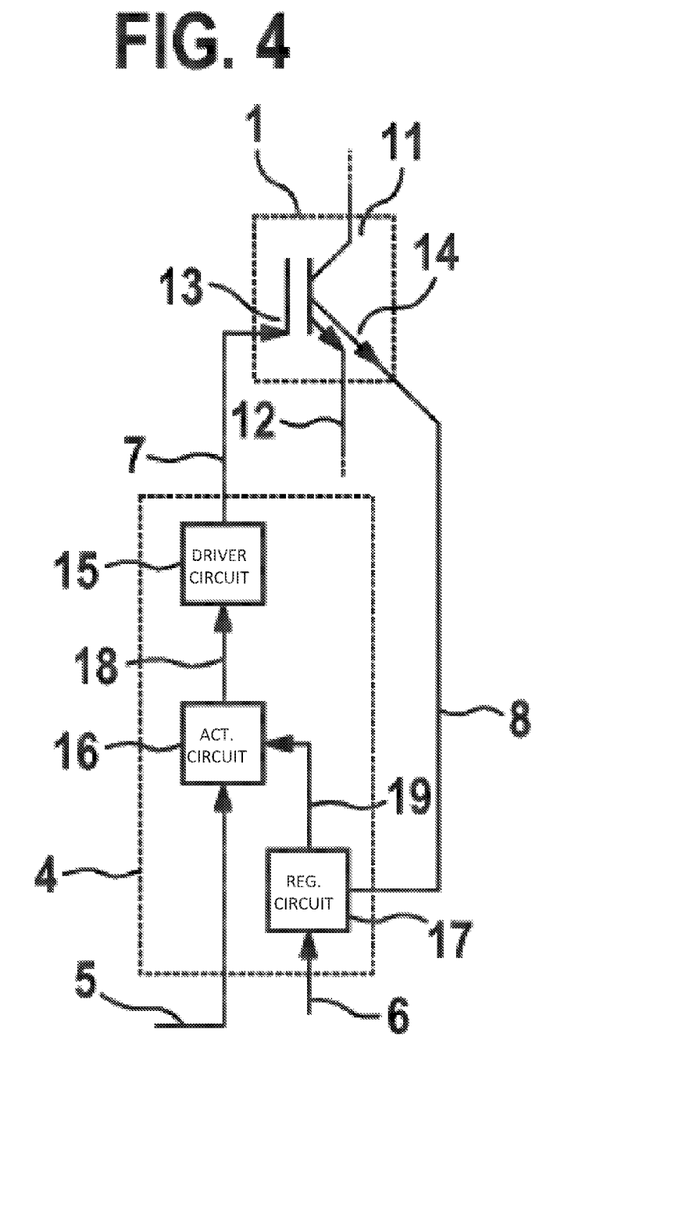
FIG. 4 shows a schematic illustration of a control device for a semiconductor switch according to another embodiment of the invention.

In order to regulate the actuation pulses which are fed into the control input 13 of the IGBT switch 1, a regulation circuit 17 may be additionally provided, which regulation circuit is coupled to the actuation circuit 16 and is designed to generate a regulation signal 19 for regulating the driver signal 18 and to feed said regulation signal into the actuation circuit 16. Such a regulation circuit 17 is illustrated, by way of example, in FIGS. 3 to 6. The regulation circuit 17 in FIGS. 3 and 5 differs from the regulation circuit in FIGS. 4 and 6 to the effect that the regulation circuit 17 is designed to record a first measurement signal 9 representing the intermediate circuit voltage and to generate the regulation signal 19 on the basis of the first measurement signal 9. In this case, the first measurement signal 9 may be tapped off, for example, at the collector connection 11 of the IGBT switch 1. In contrast, as shown in FIGS. 4 and 6, it is also possible to record a second measurement signal 8 representing a current through the semiconductor switch and to generate the regulation signal 19 on the basis of the second measurement signal 8. For this purpose, the regulation circuit 17 may be coupled to the current sensor output 14 of the IGBT switch 1. Alternatively, it may also be possible to connect the regulation circuit 17 both to the current sensor output 14 and to the collector connection 11 of the IGBT switch 1 and to generate the regulation signal 19 both on the basis of the first measurement signal 9 and on the basis of the second measurement signal 8.

In all cases, the pulse length T of the driver signal pulses 18k can be adjusted using the regulation signal 19. If, for example, the intermediate circuit voltage does not decrease or does not decrease enough, the pulse length T can be extended. Equally, the pulse length T can be reduced in the event of an excessively high current through the IGBT switch 1, for example. A voltage dip in the intermediate circuit voltage, for example, at the collector connection 11 of the IGBT switch 1 at the moment at which the IGBT switch 1 is switched on can be monitored using the first measurement signal 9. If there is no voltage dip or if the voltage dip is too low, the pulse length T can be extended. The regulation method of the regulation circuit 17 can generally be started with a short pulse length T in order to avoid overloading of the IGBT switch 1 and thus possible damage.

The regulation circuit 17 may optionally also receive further external parameters 6 which are concomitantly included in the regulation mechanism. For example, the external parameter 6 may comprise the temperature at the IGBT switch 1.

Figure 5:
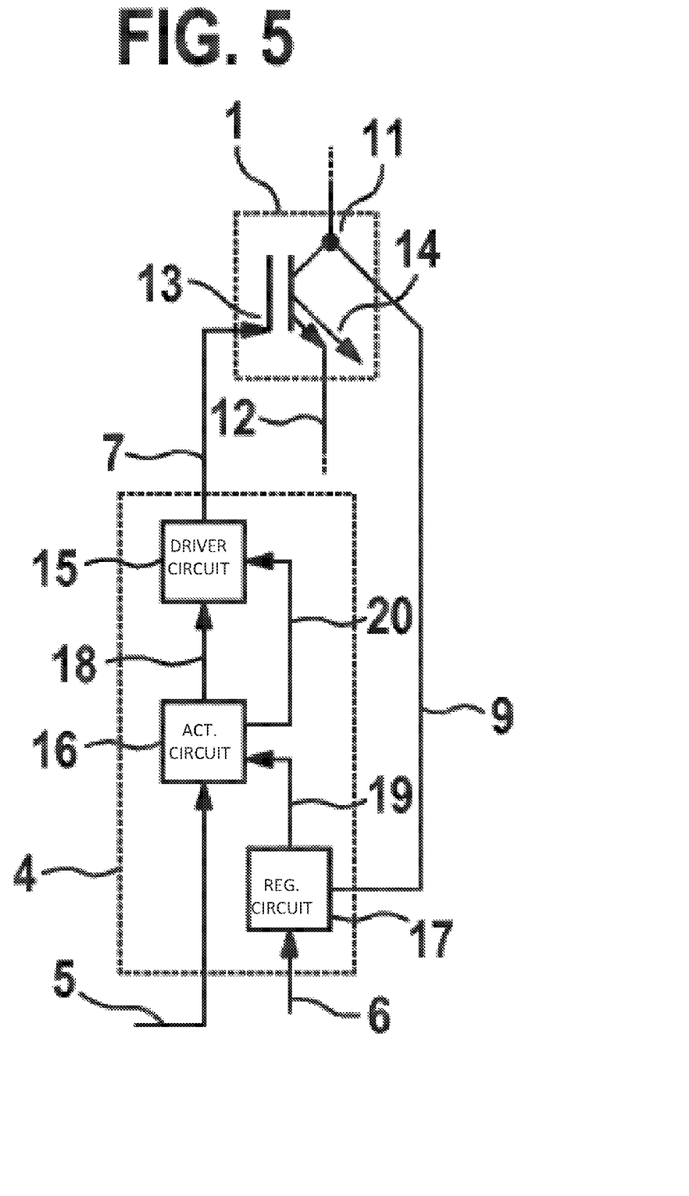
FIG. 5 shows a schematic illustration of a control device for a semiconductor switch according to another embodiment of the invention.
Figure 6:
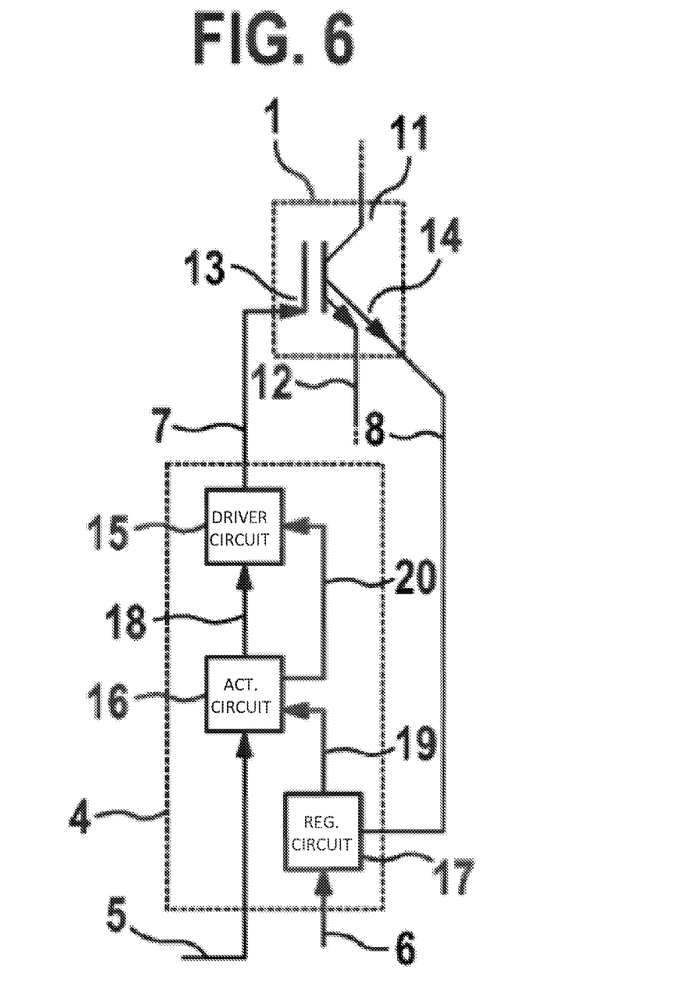
FIG. 6 shows a schematic illustration of a control device for a semiconductor switch according to another embodiment of the invention.

As schematically illustrated in FIGS. 5 and 6, in addition to the regulation circuit 17, an actuating signal 20 for adjusting an adjustable control resistance of the driver circuit 15 may be generated by the actuation circuit 16 and may be fed into the driver circuit 15. In this case, the actuating signal 20 may be generated on the basis of the regulation signal 19, for example. The actuating signal 20 can be used to selectively increase the resistance value of the control resistance of the driver circuit 15, with the result that the value of the actuation voltage which is fed into the control input 13 of the IGBT switch 1 can be reduced. In this case, the control resistance can be adapted in any desired stages, with the result that the actuation voltage and therefore the flow of current through the IGBT switch 1 can be selectively regulated using the regulation circuit 17.

Figure 8:
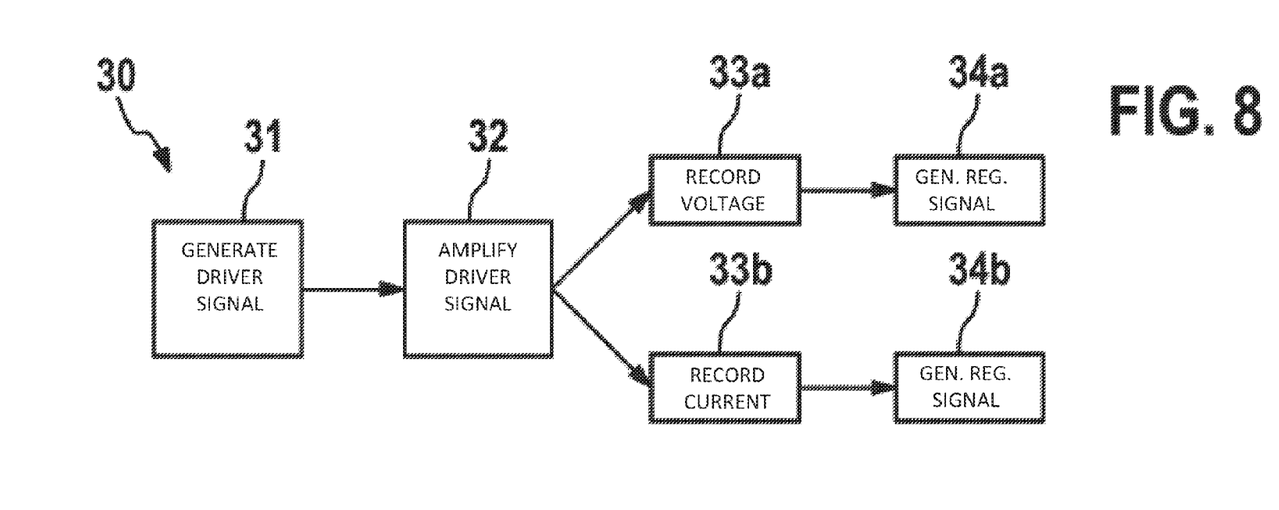
FIG. 8 shows a schematic illustration of a method for actuating an inverter according to another embodiment of the invention.

FIG. 8 shows a schematic illustration of a method 30 for actuating an inverter, in particular an inverter 10 in the electrical drive system 100 (illustrated in FIG. 1) of an electrically operated vehicle. In a first step 31, the method 30 involves generating a driver signal for at least one of the semiconductor switches of the inverter, the driver signal having a sequence of driver signal pulses. In a second step 32, the driver signal is then amplified in order to generate a control signal which actuates the at least one semiconductor switch. In this case, the driver signal pulses each have a predetermined and adjustable pulse length, with the result that the semiconductor switch is not completely conductive during the pulse length when being actuated with the control signal.

In steps 33a and 34a, a first measurement signal representing the intermediate circuit voltage can then be optionally recorded and a regulation signal for regulating the pulse length of the driver signal pulses can then be optionally generated on the basis of the first measurement signal. Alternatively or additionally, in steps 33b and 34b, a second measurement signal representing a current through the at least one semiconductor switch can be recorded and a regulation signal for regulating the pulse length of the driver signal pulses can be generated on the basis of the second measurement signal.

The method 30 can be carried out, in principle, in any operating mode of the inverter. In particular, the method 30 can be carried out in a conventional normal mode of the inverter. In this case, one or more of the semiconductor switches, which are intended to be in a closed state, can be actuated in a pulsed manner during this period of time, for example in a freewheeling mode or in the regulating mode. This or these semiconductor switch(es) then temporarily contribute(s) to discharging the intermediate circuit capacitor. In this case, it should be ensured that the voltage signals output by the inverter are not distorted or are at least only slightly distorted.

In the case of electrical machines at low speeds, for example in the case of a permanently excited synchronous machine, a reduction in the intermediate circuit voltage may already be advantageous in a freewheeling mode in order to avoid the formation of undesirable torques in the synchronous machine. In this case, the intermediate circuit voltage may be reduced in advance, for example, to a value dependent on the rotor voltage using the method 30.

However, it is particularly advantageous to carry out the method 30 in an "active short circuit" of the inverter, that is to say in a mode in which the motor windings of the electrical machine can be safely short-circuited in the event of a fault. For example, the "active short circuit" can be activated after a fault has occurred, for example in the event of failure of the voltage supply of the control system, in the event of an accident involving the vehicle or in the case of other situations which endanger the operational reliability of the electrical drive system, with the result that all semiconductor switches of one bridge side of the bridge arms, for example the high-side switches, are changed to a closed state and all semiconductor switches of the respective other bridge side of the bridge arms, for example the low-side switches, are changed to an open state. It goes without saying that the high-side and low-side switches can each also be actuated in the opposite manner. The electrical machine can thus be safely and reliably short-circuited using the closed semiconductor switches.

The semiconductor switches which are each open in the "active short circuit" state, for example the low-side switches, can be "clocked" using the method 30, instead of being in a permanently open state, that is to say can each be briefly changed to a state between blocking ability and conductivity by means of pulsed actuation. As a result, a current flows through the semiconductor switches which are actuated in a pulsed manner, the current intensity of said current being able to be adjusted to a desired value, for example, via the pulse length of the driver signal pulses. As a result, the intermediate circuit capacitor can be discharged via the semiconductor switches in the pulsed mode. In this case, the semiconductor switches may be thermally connected to a cooling device or the ambient air of the electrical drive system, with the result that heat produced during the discharge can be rapidly and safely dissipated. In principle, it is possible to include any desired number of semiconductor switches or bridge arms in the rapid discharge mode, depending on the desired discharge duration.

The invention claimed is:

1. A control device (4) for actuating a semiconductor switch (1) of an inverter (10), having:
    an actuation circuit (16) configured to generate a driver signal (18) on the basis of a switching signal (5) generated by a control system (50) of the inverter (10);
    a regulation circuit (17) coupled to the actuation circuit (16) and configured to generate a regulation signal (19) for regulating the driver signal (18) and to feed said regulation signal into the actuation circuit (16); and
    a driver circuit (15) coupled between the actuation circuit (16) and a control input (13) of the semiconductor switch (1) and configured to receive the driver signal (18) and to generate a control signal (7) which actuates the semiconductor switch (1) on the basis of the driver signal (18) and to feed said control signal into the control input (13) of the semiconductor switch (1),
    the actuation circuit (16) configured to generate the driver signal (18) as a sequence of driver signal pulses (18k) with a predetermined and adjustable pulse length (T), resulting in the semiconductor switch (1) being not completely conductive during the pulse length (T) when actuated with the control signal (7).

2. The control device (4) as claimed in claim 1, wherein the pulse length (T) is able to be adjusted in such a manner that the semiconductor switch (1) has a predetermined current value when being actuated with the control signal (7).

3. The control device (4) as claimed in claim 1, wherein the regulation circuit (17) is configured to record a first measurement signal (9) representing the intermediate circuit voltage and to generate the regulation signal (19) on the basis of the first measurement signal (9).

4. The control device (4) as claimed in claim 1, wherein the regulation circuit (17) is coupled to a current sensor output (14) of the semiconductor switch (1) and configured to record a second measurement signal (8) representing a current through the semiconductor switch (1) and to generate the regulation signal (19) on the basis of the second measurement signal (8).

5. The control device (4) as claimed in claim 1, wherein the driver circuit (15) has an adjustable control resistance for generating the control signal (7), and the actuation circuit (16) is configured to generate an actuating signal (20) for adjusting the adjustable control resistance on the basis of the regulation signal (19) and to feed said actuating signal into the driver circuit (15).

6. The control device (4) as claimed in claim 1, wherein the semiconductor switch (1) is an IGBT switch (1).

7. The control device (4) as claimed in claim 1, wherein the inverter (10) has a half-bridge circuit, and the actuation circuit (16) is configured to respectively actuate one of the semiconductor switches (1) in a half-bridge with the driver signal (18) and to permanently close the other of the semiconductor switches (1) in the half-bridge.

8. A drive system (100) for an n-phase electrical machine (3), where n≥1, having:
    an intermediate circuit capacitor (2) which is connected to two input voltage connections (T+; T−);
    an inverter (10) having a multiplicity of semiconductor switches (1a, . . . , 1f), which inverter is coupled to the intermediate circuit capacitor (2), is fed with electrical energy from the intermediate circuit capacitor (2) and is configured to generate an n-phase supply voltage for the electrical machine (3);
    a multiplicity of control devices (4a, . . . , 4f) as claimed in claim 1 which are each designed to generate a control signal (7a, . . . , 7f) for actuating one of the semiconductor switches (1a, . . . , 1f) of the inverter (10); and
    a control system (50) which is coupled to the multiplicity of control devices (4a, . . . , 4f) and is configured to generate switching signals (5a, . . . , 5f) for the semiconductor switches (1a, . . . , 1f) of the inverter (10).

9. The drive system (100) as claimed in claim 8, wherein the semiconductor switches (1a, . . . , 1f) are IGBT switches.

10. The drive system (100) as claimed in claim 8, wherein the inverter (10) has a half-bridge circuit, and the actuation circuit (16) is configured to respectively actuate one of the semiconductor switches (1) in a half bridge with the driver signal (18) and to permanently close the other of the semiconductor switches (1) in the half-bridge.

11. A method (30) for actuating an inverter (10), having the steps of:
    generating (31) a driver signal (18) for at least one of the semiconductor switches (1a, . . . , 1f) of the inverter (10), the driver signal (18) having a sequence of driver signal pulses (18k);
    generating a regulation signal (19) for regulating the driver signal (18); and
    amplifying (32) the driver signal (18) in order to generate a control signal (7a, . . . , 7f) which actuates the at least one semiconductor switch (1a, . . . , 1f), the driver signal pulses (18k) each having a predetermined and adjustable pulse length (T), with the result that the semiconductor switch (1a, . . . , 1f) is not completely conductive during the pulse length (T) when being actuated with the control signal (7a, . . . , 7f).

12. The method (30) as claimed in claim 11, also having the steps of:
    recording (33a) a first measurement signal (9) representing the intermediate circuit voltage; and
    generating (34a) a regulation signal (19) for regulating the pulse length (T) of the driver signal pulses (18k) on the basis of the first measurement signal (9).

13. The method (30) as claimed in claim 11, also having the steps of:
    recording (33b) a second measurement signal (8) representing a current through the at least one semiconductor switch (1a, . . . , 1f); and
    generating (34b) a regulation signal (19) for regulating the pulse length (T) of the driver signal pulses (18k) on the basis of the second measurement signal (8).

* * * * *